UNITED STATES PATENT OFFICE.

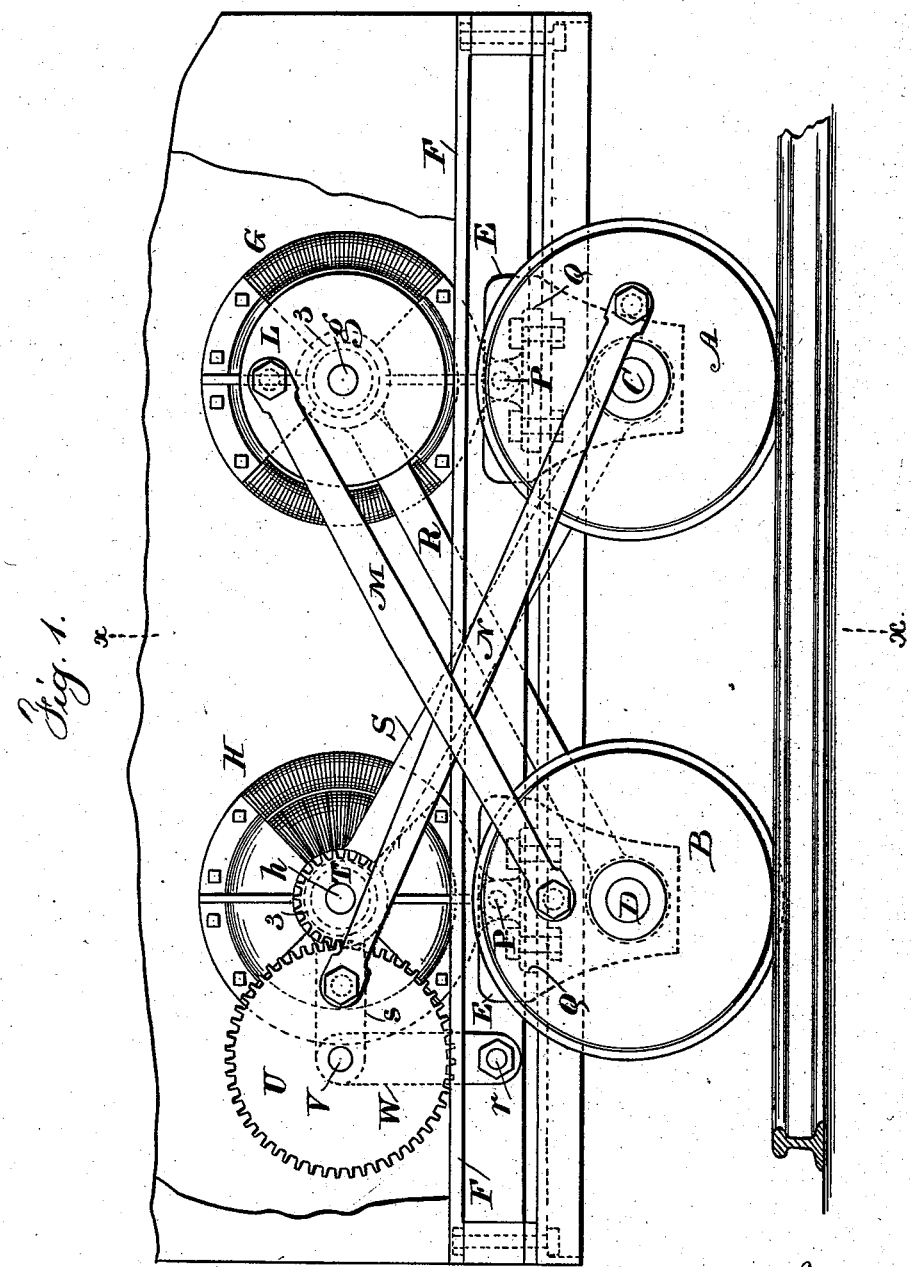

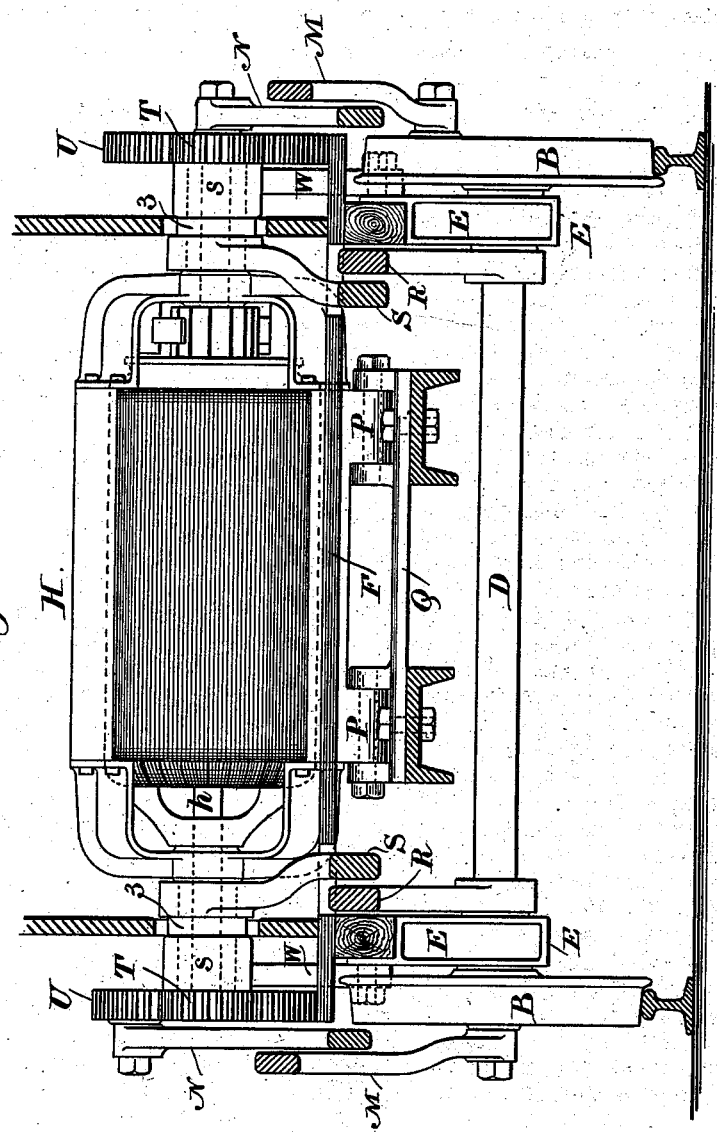

WILLIAM M. McDOUGALL, OF EAST ORANGE, NEW JERSEY.

ELECTRIC MOTOR FOR RAILWAY-CARS.

SPECIFICATION forming part of Letters Patent No. 382,483, dated May 8, 1888.

Application filed December 9, 1887. Serial No. 257,431. (No model.)

*To all whom it may concern:*

Be it known that I, WILLIAM M. McDOUGALL, of East Orange, in the county of Essex and State of New Jersey, have invented an Improvement in Electric Motors for Railway-Cars, of which the following is a specification.

Difficulty has heretofore arisen in connecting the electric motor to the driving-wheels in railway-cars, because the rise and fall of the platform or body of the car upon the springs varies the distance between the axle of the driving-wheels and the axis of the motor-armature.

My invention is made for the purpose of maintaining the proper distance between the axis of rotation of the motor and of the driving-wheels, and for reducing the motion to a minimum. With these objects in view I hinge the frame or stand of the electric motor to the platform, so that it may be rocked upon such hinges, and I connect the axis of the motor to the axle of the drivers, so that a uniform distance is maintained, and the connecting-rods between the respective crank-pins communicate the rotary movement direct to the wheels or intermediately through gearing to lessen the speed of the wheels in relation to the motor; and to lessen the rocking motion of the electric motor on its hinges, due to the rise and fall of the platform upon the springs, I place the motor so that the connecting-rods are at only a comparatively slight inclination, and where two motors are used they are over the respective drivers and connected by rods that pass by each other to the opposite cranks of the drivers.

In the drawings, Figure 1 is an elevation illustrating the relative positions of the parts, and Fig. 2 is a cross-section at the line *x x* of Fig. 1, showing one of the electric motors and part of the car.

The driving-wheels A A and B B are united in pairs by the shafts C D, and these are supported in suitable inside bearings, E, below the platform F of the motor-car, and these parts are to be of any desired character.

The electric motors G and H are of any ordinary or desired construction, and they are provided with shafts *g h*, respectively, and one or both have disks upon the ends of the shafts and crank-pins and connecting-rods to the crank-pins on their respective driving-wheels. It is preferable to place the crank-pins at ninety degrees apart on the respective pairs of driving-wheels, as in ordinary locomotives. The base or frame of each motor is provided with hinges P, upon which it can rock, and these hinges are connected to suitable bearers, Q, on the car-platform, and the electric motors are placed as low down as convenient, in order that the connecting-rods M N may be at but a comparatively small angle of inclination, to lessen as much as possible the rocking motion given to the motors as the car-platform rises and falls on the springs.

To maintain uniformity in the distances between the axis of the motors and of the drivers, the links R and S are applied, the same extending from the respective axles of the drivers to the axes of the motors. It is preferable to provide cylindrical gudgeons 3 on the motor-frames to receive the eyes at the upper ends of the respective links. It will now be apparent that each motor is connected with its driving-shaft and wheels, so that the wheels will be rotated by the armature-shaft of the motor through the agency of the connecting-rods, and the distances between the axes of rotation will be maintained by the links, and the yielding movement resulting from the rise and fall of the car upon the springs will only swing the motor upon its hinge-connections to the floor or platform.

In cases where the driving-wheels are to run slower than the electric motor, reducing gear-wheels T U are employed, and the shaft V for the wheels U extends across the car, and the frames W for the shaft V and gear-wheels T are hinged at their lower ends, *r*, to the floor and connected by links *s* to the shaft of the motor, so that all the parts rock together with the motor as the car rises or falls on the springs. The links S in this case may extend to the shaft V, or they may only extend to the shaft *h* of the motor. In either instance the motor and gearing swing together and the proper distances are maintained between the respective crank-pins.

Where only one electric motor is used it is not necessary to make any offsets or bends in the connecting-rods and links; but where there are two connecting-rods at each side, and the crank-pins have one plane in which to move, the respective links and connecting-rods are bent or made with offsets, as shown, so as to pass by each other.

I claim as my invention—

1. The combination, with the car-platform and driving-wheels and axle, of an electric motor, hinges by which the frame of the motor is connected to the car-platform, connecting-rods between the shaft of the motor and the axle, and crank-pins and connecting-rods for rotating the drivers by the motor, substantially as set forth.

2. The combination, with the car-platform and the two pairs of driving-wheels and their respective axles, of two electric motors over the respective axles, hinges for connecting the motors to the car-platform, links extending diagonally from the motor over one axle to the axle under the other motor, and cranks and connecting-rods that cross each other and extend diagonally to connect the respective crank-pins, substantially as set forth.

3. The combination, with the car-platform and driving-wheels and axle, of an electric motor, gearing, cranks, and connecting-rods for rotating the driving-wheels, and hinges to allow the parts to rock, and links to maintain the proper distance between the driving-shaft and axle, substantially as set forth.

Signed by me this 7th day of December, 1887.

W. M. McDOUGALL.

Witnesses:
 GEO. T. PINCKNEY,
 WILLIAM G. MOTT.